UNITED STATES PATENT OFFICE.

EMERICH GRANICHSTÄDTEN, OF VIENNA, AUSTRIA.

PROCESS FOR THE MANUFACTURE OF CATALYZING AGENTS OF PARTICULAR EFFICIENCY.

1,314,642.  Specification of Letters Patent.  Patented Sept. 2, 1919.

No Drawing.  Application filed May 13, 1913.  Serial No. 767,476.

*To all whom it may concern:*

Be it known that I, Dr. EMERICH GRANICHSTÄDTEN, subject of the Emperor of Austria, residing at Vienna, Austria, have invented certain new and useful Improvements in Processes for the Manufacture of Catalyzing Agents of Particular Efficiency; and I do hereby declare the following to be a full, clear, and exact description of the invention, such as will enable others skilled in the art to which it appertains to make and use the same.

It is a well known fact that by the treatment of unsaturated fatty acids or their glycerids with hydrogen in the presence of suitable catalyzing agents saturated compounds can be produced.

The catalyzing agents used in the execution of such process very frequently cause disturbances in the working, because their efficiency is extremely variable. It very often occurs that the cause of these disturbances cannot be ascertained and that the quality of the catalyst cannot be ascertained from the outward appearance of the same. These inconveniences result from the fact that the working is not reliable, the duration of the process is essentially increased and consequently the working expenses are also increased, even if the reduction process takes place at all, that losses of hydrogen become unavoidable and more especially that the oil is submitted to a heating of long duration which prejudices the color, the odor and the taste of the oil.

The manufacture of catalyzing agents was performed heretofore mostly by the well known method of the dry heating of metallic oxids in a current of hydrogen at a temperature of 500° C. A further method is also known for the production of catalyzing agents appertaining to the platinum group, this method consisting in that salts of the platinum group finely distributed in oil are reduced to metals in a current of hydrogen. The author of this method affirms that as compared with the manufacture of platinum catalysts by a dry reduction of the same this method possesses the advantage of greater simplicity and moreover the catalyst thus prepared essentially accelerates the reduction process.

This latter method appears however to be unsuitable for working on a large scale because in the first place the high price of the metals of the platinum group renders the employment of these catalysts impossible considering that losses of these metals are unavoidable and even the least amount of such losses renders the practical working of the process impossible. Furthermore, the poisoning of even a small part of the added amount of the catalyzing agent is felt in a far greater degree when the total quantity is kept within small limits.

It has now been found that the inorganic compounds of base metals which are most easily liable to dissociate, such as for instance the carbonate, in a solid or in a dissolved condition can be converted direct into metals in a most finely subdivided state by treating the same in a current of hydrogen under oil under distinctly determined conditions of pressure at a temperature of no more than 200°–230° C. When the formation of the catalyst is terminated the temperature is lowered and the reduction of the oil is performed at once so that in this manner the catalyst does not come at all into contact with the atmospheric air. In the reduction plants where the working is always performed with the circulation of a hydrogen atmosphere, the employment of organic salts of metals is impracticable, because the carbonic acid which is constantly generated cannot be eliminated from the hydrogen atmosphere, except at very high cost, besides when salts of those metals are employed which mostly come into consideration, such as for instance of nickel, explosive carbonyl-compounds are being generated. For the same reason it is impossible to use other organic compounds such as for instance carbonyls themselves. Oxids introduced into oil present combinations of a high stability and for this reason cannot be submitted to a process of reduction in the described manner.

Applicant has however found that oxids from inorganic salts in an oil medium in *statu nascendi* present in this stage by far less a stability and can be therefore directly reduced into metals in a finely divided condition when certain determinate conditions of temperature and pressure are strictly maintained.

*Example.*

1000 kilograms of castor-oil are mixed with 1.2% of finely powdered preferably freshly prepared nickel carbonate, dried at a temperature of 110° C. and the mixture is then heated to a temperature of 230° C. while a current of hydrogen is slowly allowed to pass through the same; as soon as this temperature of 230° C. is attained highly compressed hydrogen is admitted into the mixture through a capillary nozzle. The reduction of the salt to metallic nickel takes place under the well known characteristic phenomenon viz., a feeble frothing (the formation of water). As soon as this operation has been terminated the temperature is lowered and the reduction of the oil is carried out as an uninterrupted continuation of the preceding operation.

Claims:

1. The method of preparing a metal catalyzer, which comprises subjecting a heated mixture of oil and an inorganic non-catalytic metal compound to the action of a gaseous reducing agent, said compound irreducible by simply heating, and whose acid radical does not mix or combine with said oil.

2. The process of manufacturing a catalyzing agent which comprises, mixing an inorganic salt of nickel with an organic liquid indifferent to said salt, heating the mixture, and passing a reducing gas therethrough.

3. The process of manufacturing a catalyzing agent which comprises, mixing nickel-carbonate with an organic liquid indifferent to said salt, heating the mixture, and passing a reducing gas therethrough.

4. The method of preparing a metal catalyzer, which comprises subjecting a heated mixture of the oil to be reduced with an inorganic non-catalytic metal compound to the action of a reducing gas, said compound irreducible by simple heating, and whose acid radical is a gas that is eliminated from the mixture.

5. The process of manufacturing a catalyzing agent which comprises, mixing an inorganic salt of nickel with the oil to be hardened, heating the mixture to the temperature of reduction of the respective salt, passing hydrogen through the mixture until the salt is reduced, then lowering the temperature and further treating the mixture with hydrogen for the purpose of hardening the oil.

6. The process of manufacturing a catalyzing agent which comprises, mixing nickel-carbonate with the oil to be hardened, heating the mixture to the temperature of reduction of the respective salt, passing hydrogen through the mixture until the salt is reduced, then lowering the temperature and further treating the mixture with hydrogen for the purpose of hardening the oil.

7. The process of manufacturing a catalyzing agent which comprises mixing a nickel salt with the oil to be hardened, heating the mixture to the temperature of reduction of the respective salt, passing hydrogen through the mixture until the salt is reduced, then lowering the temperature and further treating the mixture with hydrogen for the purpose of hardening the oil.

In testimony that I claim the foregoing as my invention, I have signed my name in presence of two subscribing witnesses.

DR. EMERICH GRANICHSTÄDTEN.

Witnesses:
JOSEF RUBANCH,
AUGUST FUGGER.